Feb. 10, 1931.  G. HIZSA  1,792,091
SEWER BACKWATER SAFETY VALVE
Filed Feb. 26, 1930
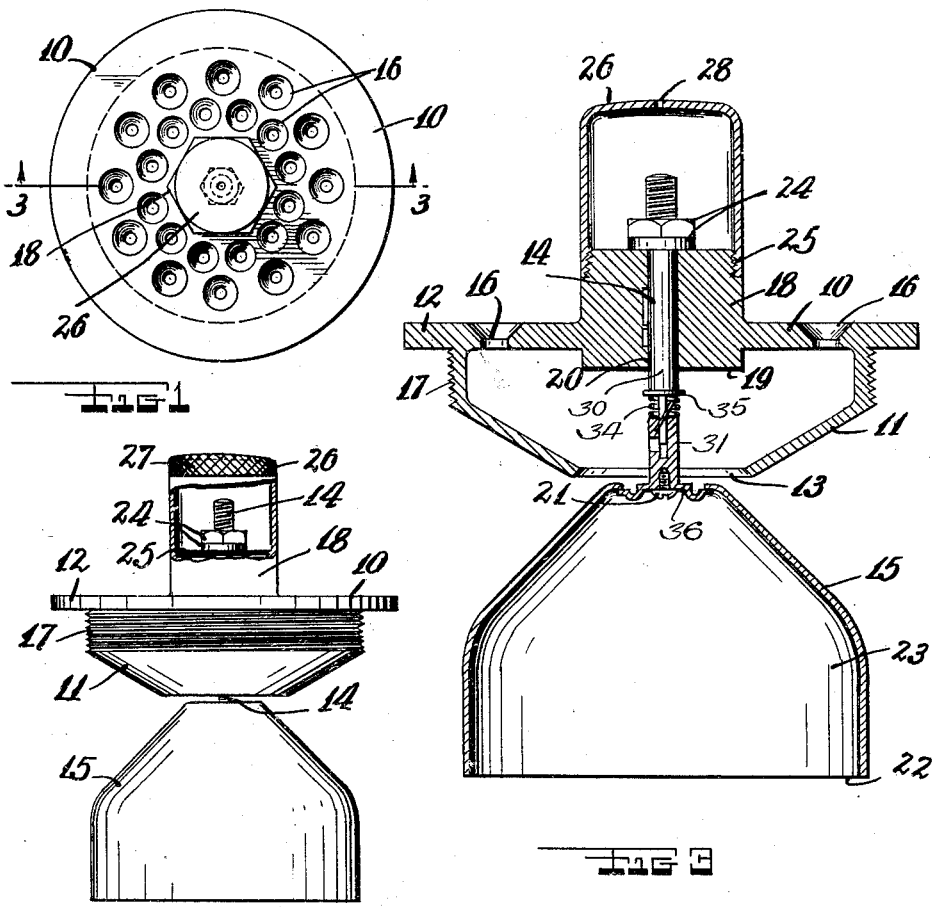
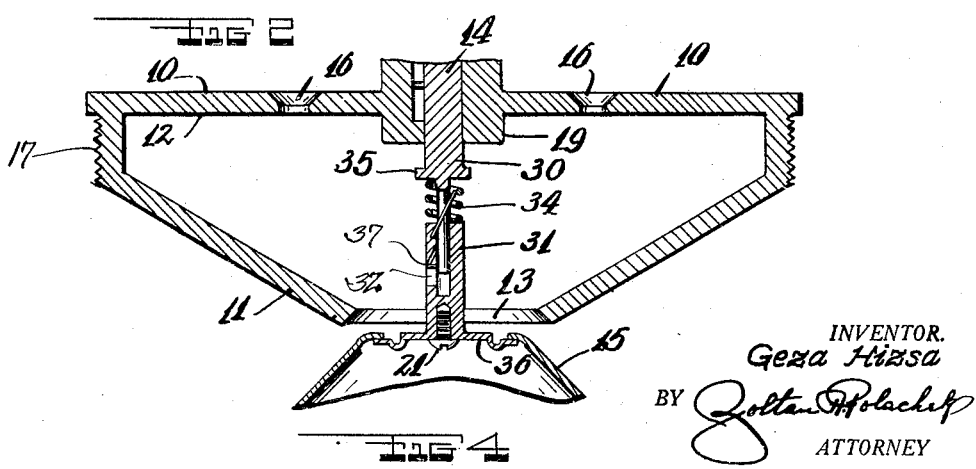
INVENTOR.
Geza Hizsa
BY Zoltan Polachek
ATTORNEY Patented Feb. 10, 1931

1,792,091

UNITED STATES PATENT OFFICE

GEZA HIZSA, OF ELIZABETH, NEW JERSEY

SEWER-BACKWATER SAFETY VALVE

Application filed February 26, 1930. Serial No. 431,367.

This invention relates to new and useful improvements in a sewer backwater safety valve.

The invention has for an object the provision of a device of the class mentioned which is of simple durable construction, dependable in use and efficient in action, and which can be manufactured and sold at a reasonable cost.

The invention proposes a perforated disc for attachment on a sewer pipe or trap and provided with a shell on its bottom side enclosing said perforations and terminating at the bottom in a valve seat, a stem slidable thru said disc coaxial with the axis of said valve seat, a valve head attached on said stem for engaging said valve seat and of inverted cup shape to entrap air and be buoyant on rising water, and means for limiting the downward motion of said stem to determine the normal open position of said valve.

It is conventional to provide floating rubber or metallic ball valves in sewer backwater safety valves which are held and guided at their extreme outer surfaces on projections from the valve seat member. The instant invention distinguishes from this construction in the valve head which is of a design making the entire device more efficient and more sensitive to the fluctuations of the sewer backwater pressure. This is particularly so for valves of the same sizes.

The inverted cup shaped or bell shaped valve head necessarily has a large bottom opening for cupping upon the surface of rising water. Further, it has a substantial cubical volume for entrapping a large quantity of air which may be slightly compressed for the purpose hereinafter fully stated. The design of the valve head adds agility to its operation so that it opens and closes very rapidly, preventing escape of sewer water into a cellar or basement. The invention also proposes means for urging the valve into good sitting position on said valve seat upon the closing of the valve.

For further comprehension of the invention, and of the objects and advantages thereof, reference will be had to the following description and accompanying drawings and to the appended claims in which the various novel features of the invention are more particularly set forth.

In the accompanying drawing forming a material part of this disclosure:—

Fig. 1 is a plan view of a device constructed according to this invention.

Fig. 2 is a side elevational view of Fig. 1.

Fig. 3 is a vertical sectional view taken on the line 3—3 of Fig. 1.

Fig. 4 is an enlarged fragmentary view of a portion of Fig. 3.

The sewer backwater safety valve consists of a perforated disc 10 for attachment on a sewer pipe or trap and provided with a shell portion 11 on its bottom side 12 enclosing the perforations of said disc and terminating at the bottom in a valve seat 13, a stem 14 slidable thru said disc 10 coaxial with the axis of said valve seat 13, a valve head 15 attached on said stem 14 for engaging upon said seat 13 and of inverted cup shape to entrap air and be buoyant on rising water, and means for limiting the downward motion of said stem to determine the normally opened position of said valve.

The perforations on the disc 10 are indicated by reference numeral 16 and are circular and countersunk at the tops. The attachment of the perforated disc upon a sewer pipe or trap may be accomplished with threads 17 externally arranged upon the shell 11. A hexagonal portion 18 projects from the top of the disc 10 for engagement with a wrench or other tool so as to screw the device in place. The shell accomplishes an inclosing of the perforations 16 so that all water passing thru these perforations must pass the valve seat 13. A boss 19 is formed upon the bottom of the disc 12 and an aperture 20 is formed thru the boss 19, the disc 10 and the hexagonal portion 18 for the reception of the stem 14 and constituting the slidable arrangement of the stem.

A screw 21 engages thru the valve head 15 and into the bottom of the stem 14 and accomplishes the securing together of these parts. The inverted cup shaped valve head 15 has a large diameter bottom opening 22 for cupping upon rising water. Further, its cubical volume 23 is relatively large as compared with a sphere made of the same mass and same thickness of material. The means for limiting downward motion of the stem to determine the normally opened position of the valve consists of a pair of nuts 24 threadedly engaged upon the top of the stem and abuttable against the projection 18. A portion of the projection 18 is formed with threads 25 so that a cap 26 may be threadedly engaged thereon and cover the top of the stem 14 and the nuts 24. This cap is formed with a knurled portion 27 for manual clipping in its removal, and with a top aperture 28 for ventilation.

In operation of the device, water from the exterior may flow thru the perforated disc and past the valve seat 13 into the sewer or other discharge pipe. In the event that the water from the sewer backs up, it engages against the bottom of the valve head 15 entrapping air within the valve head causing it to be buoyant and rise for engaging against the seat 13 and cutting off the passage of the water up thru the perforations 16 and into the basement, cellar or other place. After the water has receded, the valve head 15 falls under the action of gravity so that water may run down into the sewer. The nuts 24 may be adjusted for regulating the amount to which the valve head 15 moves from its seat.

In Fig. 4, a portion of Fig. 3 has been enlarged to clearly show a means for urging the valve 15 into good sitting position upon the valve seat 13 upon closing of the valve. This means consists of stem sections 30 and 31 constituting the stem 14 and threadedly engaging each other so that upon being forced together to move apart to slightly turn relative to each other. A pin 32 projects from one of the stem sections and engages in an opening 33 in the other stem section for limiting the separating of these parts. An expansion spring 34 acts between the stem sections for normally urging them into spread positions.

A protuberance 35 projects from the top stem section and is engageable against the boss 19 on the bottom of the disc 10 for limiting the upward motion of the top stem section. The bottom stem section 31 is attached upon a metallic diaphragm 36 attached upon the closing and opening in the top of the valve head 15. When the valve head rises under the upward motion of rising water, it engages against the valve seat 13 for preventing backflow of the sewer. Continued rising of the water within the sewer compresses the air within the valve head 15 so that the diaphragm 36 moves upwards causing the valve stem section 31 to move closer to the stem section 30 and therefore turn relative thereto so that the valve head turns upon the valve seat 13 and away or assumes a better sitting position.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A sewer backwater safety valve, comprising a perforated disc for attachment on a sewer pipe or trap and provided with a shell on its bottom side enclosing said perforations and terminating at the bottom in a valve seat, a stem slidable thru said disc coaxial with the axis of said valve seat, a valve head attached on said stem for engaging said valve seat and of inverted cup shape to trap air and be buoyant on rising water, means for limiting the downward motion of said stem to determine the normally opened position of said valve, and means for urging the valve into good sitting position on said valve seat upon closing of the valve, comprising stem sections constituting said stem and threadedly engaged with each other so that upon slight longitudinal movements to slightly rotate relative to each other, and means for limiting the relative movements of the stem sections, means for normally urging the stem sections apart, and a metal diaphragm engaged over an opening in said valve head and connected with the bottom of said stem sections.

2. A sewer backwater safety valve, comprising a perforated disc for attachment on a sewer pipe or trap and provided with a shell on its bottom side enclosing said perforations and terminating at the bottom in a valve seat, a stem slidable thru said disc coaxial with the axis of said valve seat, a valve head attached on said stem for engaging said valve seat and of inverted cup shape to trap air and be buoyant on rising water, means for limiting the downward motion of said stem to determine the normally opened position of said valve, and means for urging the valve into good sitting position on said valve seat upon closing of the valve, comprising stem sections constituting said stem and threadedly engaged with each other so that upon slight longitudinal movements to slightly rotate relative to each other, and means for limiting the relative movements of the stem sections, an expansion spring for normally urging the stem sections apart, and a metal diaphragm engaged over an opening in said valve head and connected with the bottom of said stem sections.

3. A sewer backwater safety valve, comprising a perforated disc for attachment on a sewer pipe or trap and provided with a shell on its bottom side enclosing said perforations and terminating at the bottom in a valve seat, a stem slidable thru said disc coaxial with the axis of said valve seat, a valve head attached on said stem for engaging said valve seat and of inverted cup shape to trap air and be buoyant on rising water, means for limiting the downward motion of said stem to determine the normally opened position of said valve, and means for urging the valve into good sitting position on said valve seat upon closing of the valve, comprising stem sections constituting said stem and threadedly engaged with each other so that upon slight longitudinal movements to slightly rotate relative to each other, and means for limiting the relative movements of the stem sections, comprising a pin projecting from one of said sections and an aperture formed in the other section for receiving said pin, means for normally urging the stem sections apart, and a metal diaphragm engaged over an opening in said valve head and connected with the bottom of said stem sections.

In testimony whereof I have affixed my signature.

GEZA HIZSA.